US012756621B2

(12) United States Patent
Namjoshi

(10) Patent No.: US 12,756,621 B2
(45) Date of Patent: Oct. 6, 2026

(54) CAUSAL, IN-PLACE NETWORK UPDATES USING ACYCLIC DECOMPOSITION

(71) Applicant: Nokia Solutions and Networks Oy, Espoo (FI)

(72) Inventor: Kedar Namjoshi, Murray Hill, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 74 days.

(21) Appl. No.: 19/012,164

(22) Filed: Jan. 7, 2025

(65) Prior Publication Data

US 2026/0197233 A1 Jul. 9, 2026

(51) Int. Cl.
*H04L 41/082* (2022.01)

(52) U.S. Cl.
CPC .................................. *H04L 41/082* (2013.01)

(58) Field of Classification Search
CPC ..................................................... H04L 41/082
See application file for complete search history.

(56) References Cited

U.S. PATENT DOCUMENTS

| | | | |
|---|---|---|---|
| 9,876,727 | B2 | 1/2018 | Gaist |
| 11,582,096 | B2 | 2/2023 | Aharon |
| 12,184,491 | B1 | 12/2024 | Namjoshi |
| 2018/0309635 | A1 | 10/2018 | Lopes |

OTHER PUBLICATIONS

Babaoglu, Özalp, et al. "Consistent Global States of Distributed Systems: Fundamental Concepts and Mechanisms." Distributed Systems (2nd Ed.) ACM Press/Addison-Wesley Publishing Co., USA (1993) 55-96.
Chandy, K. Mani, et al. "Distributed Snapshots: Determining Global States of Distributed Systems." ACM Transactions on Computer Systems (TOCS) 3.1 (1985): 63-75.
Dijkstra, Edsger W. "The Distributed Snapshot of KM Chandy and L. Lamport." Technical Report, University of Texas at Austin. Document Code EWD864a ( 1983): 1-5.
Foerster, Klaus-Tycho, et al. "Survey of Consistent Software-Defined Network Updates." IEEE Communications Surveys & Tutorials 21.2 (2019): 1435-1461.
Reitblatt, Mark, et al. "Abstractions for network update." ACM SIGCOMM 2012 Conference, SIGCOMM '12, Helsinki, Finland—Aug. 13-17; ACM SIGCOMM Computer Communication Review 42.4 (2012): 323-334.

(Continued)

*Primary Examiner* — Benjamin M Thieu
(74) *Attorney, Agent, or Firm* — ALSTON & BIRD LLP

(57) ABSTRACT

According to an update procedure for a network of interconnected nodes, a node keeps track of markers received on the node's incoming channels, transmits a marker on each outgoing channel (if any exist), and updates its node configuration from an old configuration to a new configuration. The node determines how to handle (i.e., process, queue, or drop) each incoming data packet based on (i) whether or not it has updated its node configuration yet and (ii) whether or not it has received a marker on the corresponding incoming channel yet. Packet drops may be reduced by either (i) decomposing one or more cyclic portions of the network into acyclic portions or (ii) processing backwards-compatible packets received at an updated node from an un-updated node when the processing rules for those packets were not changed by the new node configuration at the updated node or (iii) both.

17 Claims, 5 Drawing Sheets

400

(56) References Cited

OTHER PUBLICATIONS

Namjoshi, Kedar S., et al. "Algorithms for in-place, Consistent Network update." Proceedings of the ACM SIGCOMM 2024 Conference, Aug. 4, 2024, pp. 244-257.
Even, G., et al. "Approximating Minimum Feedback sets and Multicuts in Directed Graphs." Algorithmica, vol. 20, No. 2, Feb. 1998, pp. 151-174.
U.S. Appl. No. 19/012,164; filed Jan. 7, 2025.

200

300

CAUSAL, IN-PLACE NETWORK UPDATES USING ACYCLIC DECOMPOSITION

CROSS-REFERENCE TO RELATED APPLICATIONS

The subject matter of this application is related to the subject matter of U.S. patent application Ser. No. 18/459,918 ("the '918 application") filed Sep. 1, 2023, the teachings of which are incorporated herein by reference in their entirety.

BACKGROUND

Field of the Disclosure

The present disclosure relates to networks of interconnected nodes and, more specifically but not exclusively, to techniques for updating the node configuration of one or more nodes of such a network.

Description of the Related Art

This section introduces aspects that may help facilitate a better understanding of the disclosure. Accordingly, the statements of this section are to be read in this light and are not to be understood as admissions about what is prior art or what is not prior art.

Networks route packets through nodes with different functionalities, such as routers and firewalls. Occasionally, the network behavior must be modified to redirect traffic in response to congestion, failures, or new security policies. A network is a concurrently active and physically distributed system. As such, one may expect that making modifications to its behavior in a haphazard manner will lead to difficulties. Indeed, it is well understood that updating node functionality in the wrong order may lead to a network misdirecting traffic, violating security policies, creating routing loops, and other such failures. While the failures may be temporary, they are nonetheless concerning, since they may give rise to security holes (e.g., from misdirected traffic) or performance penalties (e.g., from routing loops).

As a consequence, there is extensive research on determining the right ordering for network updates. But what should "right ordering" mean? The validity of a network update can be characterized by the routing properties that are preserved across the update process. The pioneering work of Reitblatt et al. introduced the notion of "per-packet consistency," the property that any packet is processed entirely by the old configuration or by the new one. See Mark Reitblatt, Nate Foster, Jennifer Rexford, Cole Schlesinger, and David Walker, "Abstractions for network update," 323-334, ACM SIGCOMM 2012 Conference, SIGCOMM '12, Helsinki, Finland, Aug. 13-17, 2012 ("Reitblatt et al."), the teachings of which are incorporated herein by reference. This ensures that every assertion about packet history (such as the absence of a routing loop) that is preserved by either configuration is preserved across an update. Their "two-phase" update algorithm guarantees per-packet consistency; however, it requires (in general) that each node support both old and new configurations throughout the update process, which is a serious limitation in practice. For instance, high-speed routers rely on specialized and expensive hardware with limited memory capacity and cannot support two configurations concurrently.

SUMMARY

Problems in the prior art are addressed in accordance with the principles of the present disclosure by a new network update method that is on-the-fly (i.e., it operates concurrently with the network) and in-place (i.e., a node supports either the old or the new configuration, never both at the same time). The new procedure is referred to as a causal network update, because it tracks the causal dependencies introduced between processes through packet transmissions. The algorithm guarantees per-packet consistency. Indeed, the algorithm has the stronger property that an update appears to occur instantaneously, even though in reality nodes are updated over time and the update actions are interleaved with normal network operation. The drawback is that, in some runs of the algorithm, packets may be "trapped" between old and new configurations and may need to be dropped to ensure consistency. Such losses can be handled by higher-level network and application layers, which are designed to recover from (temporary) packet losses. The basic update algorithm has optimizations that limit or eliminate forced packet loss by taking network structure and update characteristics into account. Packet losses may be further reduced by either (i) decomposing one or more cyclic portions of the network into acyclic portions or (ii) processing backwards-compatible packets at an updated node when the processing rules for those packets were not changed by the updated node's new node configuration or (iii) both.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
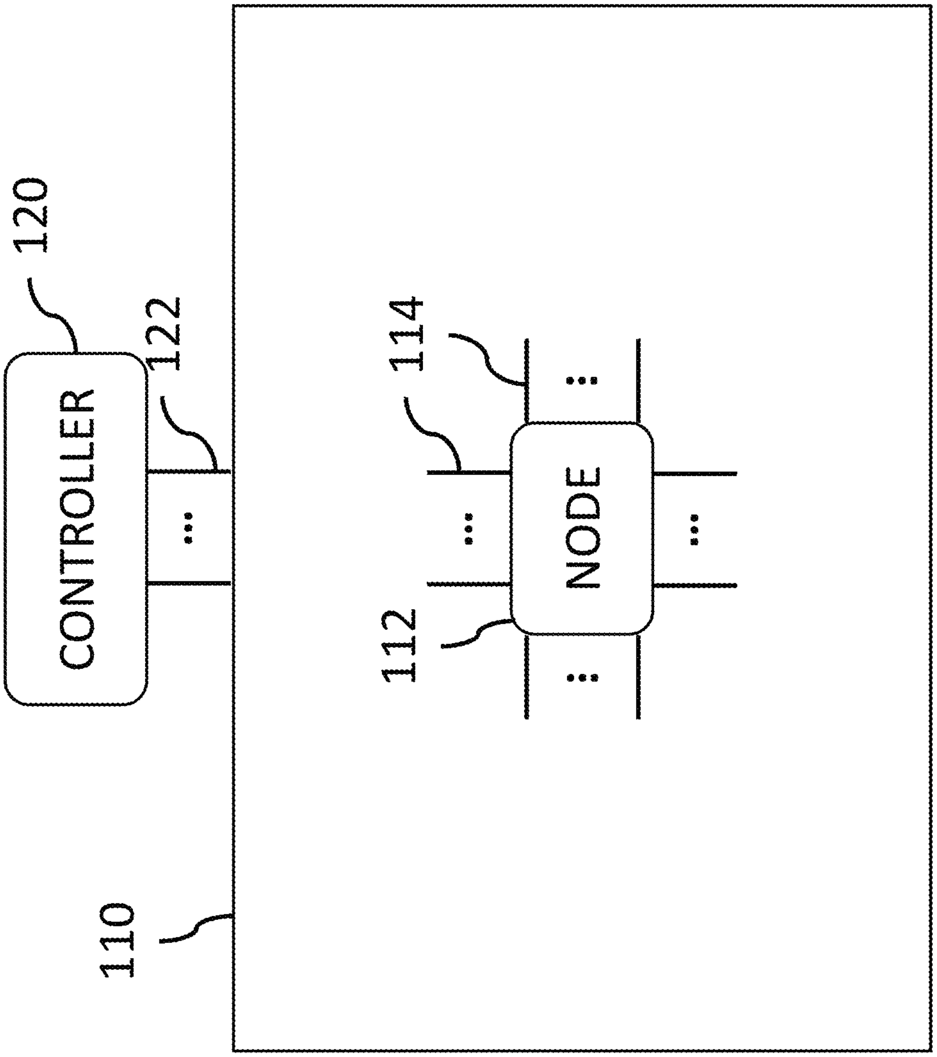
FIG. 1 is a simplified block diagram of a network according to certain embodiments of the present disclosure.

FIG. 1 is a simplified block diagram of a network 100 according to certain embodiments of the present disclosure. Network 100 comprises a set 110 of interconnected nodes 112 and a controller 120 that controls the operations of the nodes 112, where each node 112 has one or more unidirectional or bidirectional links 114 with one or more other nodes 112 in the network 100. Each unidirectional link 114 corresponds to either (i) an incoming channel for receiving from another node 112 incoming data packets to be processed and/or re-transmitted by the receiving node 112 or (ii) an outgoing channel for transmitting to another node 112 outgoing data packets to be processed and/or re-transmitted by the other node 112. Each bidirectional link 114 corresponds to both an incoming channel and an outgoing channel with another node 112. In addition to these (internal) links 114 with other nodes 112 of the network 100, each node 112 might also have one or more (external) links (not shown) with the external world (i.e., elements outside of the network). These external links are not part of or relevant to the update procedures of the present disclosure.

The controller 120 independently configures (e.g., programs) each node 112 with a node configuration that determines (i) how the node 112 processes incoming data packets received on its incoming channels, if any exist, and/or (ii) how the node 112 generates and transmits outgoing data packets on its outgoing channels, if any exist. The controller 120 can independently instruct each node 112 to replace its current (so-called "old") node configuration with a different (so-called "new") node configuration as needed to support the dynamically changing operations of the network 100.

Although FIG. 1 shows only a single instance of node 112, those skilled in the art will understand that FIG. 1 represents a set 110 of multiple instances of that single node 112, where each node 112 in the set 110 is connected to one or more other nodes 112 by one or more links 114, and the topology of the set 110 corresponds to a single interconnected graph. Furthermore, in addition to being connected to at least one other node 112, each node 112 is also connected to the controller 120 by a backend link 122 by which the controller 120 communicates with the node 112.

In order to update its operations from its old node configuration to a new node configuration as part of a network update, each node 112 individually performs a specific update procedure. Note that each node 112 performs the update procedure even when the node's new node configuration is the same as the node's old node configuration for situations in which only some of the nodes 112 in the network 100 have their node configurations change as part of the network update.

The update procedure involves the propagation throughout the network 100 of special packets referred to as marker packets or markers, for short. A marker packet received by a node 112 on one of its incoming channels is referred to herein as an incoming marker, and a marker packet transmitted by a node 112 on one of its outgoing channels is referred to herein as an outgoing marker. As used herein, the term "data packet" refers to any non-marker packet transmitted between nodes 112 within the network 100. A marker packet may be distinguished from a data packet by setting an otherwise unused packet field.

According to the update procedure, each node 112 that has one or more incoming channels, keeps track of the receipt of an incoming marker on each of those incoming channels. In addition, each node 112 that has one or more outgoing channels, is capable of transmitting an outgoing marker on each of those outgoing channels.

According to a first version of the update procedure:

1. Say that a node 112 receives an initial incoming marker at a time T0 on one of its incoming channels. At some time T1 that is greater than or equal to T0, the node 112 does the following. It replaces its old node configuration with its new node configuration (i.e., the node 112 performs a node-configuration replacement) and (preferably immediately) transmits an outgoing marker on all of its outgoing channels, if any exist, before processing any more incoming data packets or transmitting any more outgoing data packets.
2. Note that delaying the node-configuration replacement may reduce the number of dropped data packets, but at the expense of delaying the completion of the overall network update.
3. Between times T0 and T1, the node 112 processes each incoming data packet as follows:
   a. For an incoming channel on which the node 112 has already received an incoming marker, the node 112 queues the incoming data packet for later processing (i.e., after the node-configuration replacement).
   b. For an incoming channel on which the node 112 has not yet received an incoming marker, the node 112 processes the incoming data packet according to the node's old node configuration.
4. After the node-configuration replacement at time T1, the node 112 processes each incoming data packet as follows:
   a. For an incoming channel on which the node 112 has already received an incoming marker, the node 112 processes the incoming data packet according to the node's new node configuration. (Note that this includes any packets that might have been queued up for this channel in step 3(a).)
   b. For an incoming channel on which the node 112 has not yet received an incoming marker, the node 112 drops the incoming data packet.

This first version of the update procedure is initiated by the network controller 120 instructing a selected subset of one or more initial nodes 112 to perform Step 1 listed above (i.e., transmit an outgoing marker on each of its outgoing channels before processing any more incoming data packets or transmitting any more outgoing data packets), even though those initial nodes 112 have not yet received any incoming markers. Each initial node 112 will then continue to operate according to the other bullets listed above.

The subset of initial nodes 112 is selected so as to guarantee that every node 112 in the network 100 will eventually receive an incoming marker on every one of its incoming channels, if any exist. This subset is selected, for example, by the network controller 120 or some other external entity, based on the known topology of the network 100. The subset of initial nodes 112 is preferably selected to minimize the typical number of data packets dropped during the update procedure. This will usually involve the number of initial nodes 112 in the selected subset being relatively small. Note that the subset of initial nodes 112 must include any and all nodes 112 in the network 100 having no incoming channels. Depending on the network topology, the selected subset may also include one or more nodes 112 that do have at least one incoming channel.

This first version of the update procedure is completed after every node 112 in the network 100 has (i) received an incoming marker on every one of its incoming channels, if any exist, and (ii) replaced its old node configuration with its new node configuration. At that point, every node 112 in the network 100 will be processing all incoming data packets and transmitting all outgoing data packets using its new node configuration.

As long as the subset of initial nodes is properly selected, the first version of the update procedure can be performed by the nodes in any fully connected network of nodes no matter how those nodes are interconnected by incoming and outgoing channels (i.e., independent of the topology of the network). There is another, second version of the update procedure that can be used for acyclic networks. An acyclic network is a network in which there is no cycle. (By a standard definition, a cycle in a network is a sequence of nodes $n_0, n_1, \ldots, n_k$ (with k>0) such that every node in the sequence has an outgoing channel connecting to the next node in the sequence (if any) and $n_k = n_0$.) A pipelined network is an example of an acyclic network. A more-general acyclic network is a dataflow network.

According to this second version of the update procedure, the node 112 follows the same steps as in the first version of the update procedure described above. However, in this second version, for nodes having at least one incoming channel, the node 112 transitions from Step 3 to Step 4 only after a marker has been received on every incoming channel. That is, the time T1 is chosen so that it is at or after the point in time where a marker has been received on every incoming channel.

In the first version of the update procedure, there is a fixed (but unspecified) gap between time T0 and time T1, because the node 112 cannot always wait for a marker from every channel, as that could lead to a deadlocked update protocol in some network topologies that have cycles. In an acyclic network, however, deadlock cannot occur. Note that this second version for acyclic networks does not drop any packets.

In the second version, since node-configuration replacement occurs after the node 112 has received an incoming marker on all of its incoming channels, after the node-configuration replacement, the node 112 cannot receive an incoming data packet on an incoming channel that has not yet received an incoming marker.

As in the first version of the update procedure, the second version of the update procedure is initiated by the network controller 120 instructing a selected subset of one or more initial nodes 112 to perform the first bullet listed above (i.e., perform its node-configuration replacement), even though those initial nodes 112 have not yet received any incoming markers. Each initial node 112 will then continue to operate according to the other bullets listed above for the second version of the update procedure.

Here, too, the subset of initial nodes 112 is selected to guarantee that every node 112 in the acyclic network 100 will eventually receive an incoming marker on every one of its incoming channels, if any exist. As before, this subset is selected, for example, by the network controller 120 or other external entity, based on the known topology of the acyclic network 100. For the acyclic network 100, the selected subset of initial nodes 112 must be precisely any and all nodes 112 in the acyclic network 100 that do not have an incoming channel.

As before, this second version of the update procedure is completed after every node 112 in the network 100 has (i) received an incoming marker on every one of its incoming channels, if any exist, and (ii) replaced its old node configuration with its new node configuration. At that point, every node 112 in the network 100 will be processing all incoming data packets and transmitting all outgoing data packets using its new node configuration.

Note that it is possible for one or more portions of a network 100 to be acyclic, while one or more other portions of that network 100 are cyclic. In such a network 100, it is possible for the network controller 120 to configure nodes 112 in one or more of the acyclic portions to operate according to the second version of the update procedure, while the rest of the nodes 112 in the network 100 operate according to the first version of the update procedure. It is also possible for the network controller 120 to re-configure nodes 112 in acyclic portions between the first and second versions of the update procedure over time.

Depending on the implementation, there are different ways in which the controller 120 can orchestrate a network update independent of which version of the update procedure is performed by the nodes 112. In one possible implementation, the controller 120 downloads to each node 112 its new node configuration, which each node 112 stores along with its old node configuration in its local memory, before the controller 120 instructs the subset of initial nodes 112 to begin their update procedures. In that case, when each node 112 eventually determines that it is time to perform its node-configuration replacement, the node 112 retrieves its new node configuration from its local memory and uses it to replace its old node configuration.

In another possible implementation, when each node 112 eventually determines that it is time to perform its node-configuration replacement, the node 112 signals the controller 120, which then downloads the node's new node configuration to the node 112, which then uses it to replace its old node configuration. This implementation can reduce the local memory requirements at the nodes 112 at the expense of more backend signaling with the controller 120.

Note that, in either implementation, if a given node's new node configuration is the same as the node's old node configuration, the controller 120 might not need to download the new node configuration. Instead, the node 112 will be informed by the controller 120 or otherwise recognize that it can continue to use its old node configuration. A network graph analysis (as described in the section entitled Update Structure in the '918 application) may be used to determine whether a node whose configuration is unchanged must participate in the update protocol.

As described previously, the network update is completed when every node 112 has completed its update procedure. In some implementations, each node 112 notifies the controller 120 when the node 112 has completed its update procedure so that the controller 120 can determine when the network update has been completed. In other implementations, the controller 120 knows how long each network update should take without being explicitly informed by the nodes 112.

In some implementations, each incoming and outgoing marker contains no information other than that the packet is a marker packet. In other implementations, each marker may include an update value, such as a count value, that identifies the particular network update with which the marker is associated, where different network updates have different update values, so that the nodes 112 will be able to distinguish markers for different network updates. The use of these update values is described further below.

Note that the techniques described in the present disclosure can be implemented in the context of either physical networks or virtual networks. Since, in essence, all that matters to the update procedure is the network showing how nodes are connected, a link from a node X to a node Y may be a single physical link, or it could be a virtual link (e.g., in a virtual private network (VPN)) that is implemented by an underlying physical network. Similarly, the update procedure does not require a packet to be a network packet—it could be an application-level message, so that the update procedure could also be applied to update components of an application-level distributed system, so long as that system can recover from packet or message losses.

Figure 2:
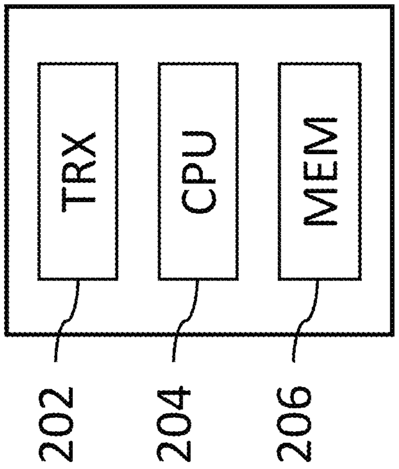
FIG. 2 is a simplified hardware block diagram of an example device that can be used to implement any of the nodes of FIG. 1.

FIG. 2 is a simplified hardware block diagram of an example device 200 that can be used to implement any of the nodes 112 of FIG. 1. As shown in FIG. 2, the device 200 includes (i) communication hardware (e.g., wireless, wireline, and/or optical transceivers (TRX)) 202 that supports communications with other devices, such as other nodes 112 or the network controller 120, (ii) a processor (e.g., CPU microprocessor) 204 that controls the operations of the device 200, and (iii) a memory (e.g., RAM, ROM) 206 that stores code executed by the processor 204 and/or data generated and/or received by the device 200. Note that the network controller 120 of FIG. 1 may be implemented using an analogous suitable configuration of communication hardware, processors, and memories.

Network Decomposition

The first version of the network update procedure can be successfully applied to any network, while the second version can be successfully applied to any acyclic network. A given network may have one or more cyclic portions and one or more acyclic portions. In such a network, the cyclic portions can be updated using the first version of the network update procedure, while the acyclic portions can be updated using the second version.

The number of dropped packets during the update of a network having one or more cyclic portions may be reduced by decomposing one or more and possibly all of the cyclic portions in the network into acyclic portions and then performing the second version of the network update procedure at the nodes of the acyclic portions with the first version being performed at the nodes of any remaining cyclic portions in the network.

Figure 3B:
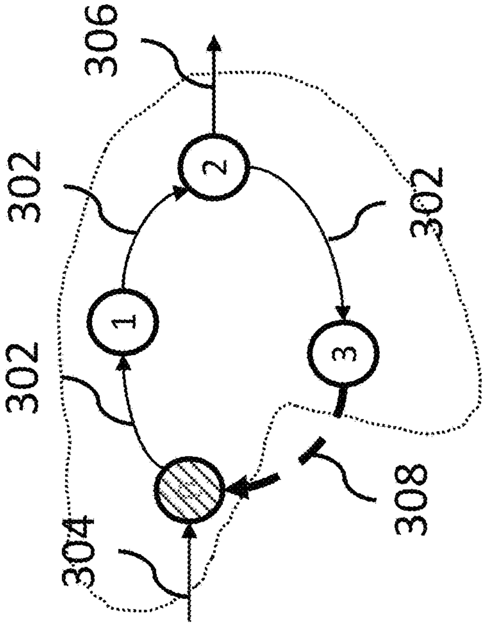
FIG. 3B is a graphical representation of one possible decomposition of the cyclic portion of FIG. 3A.
Figure 3C:
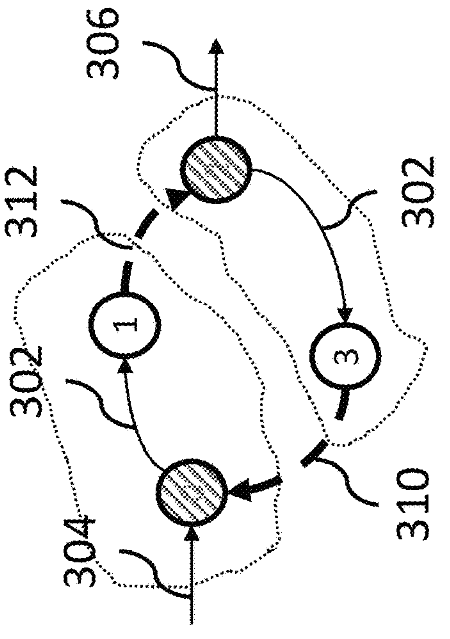
FIG. 3C is a graphical representation of another possible decomposition of the cyclic portion of FIG. 3A.
Figure 3A:
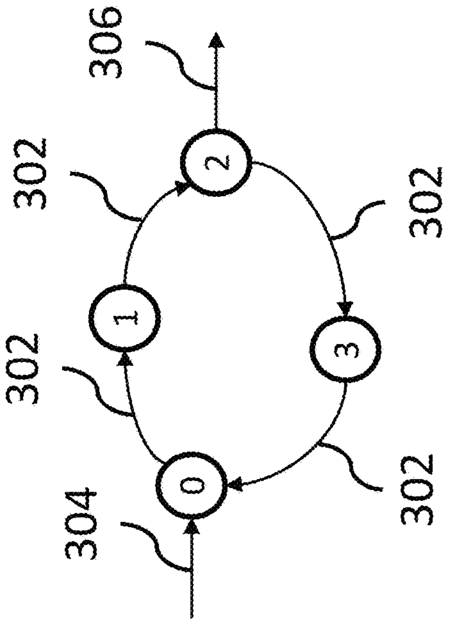
FIG. 3A is a graphical representation of a simple cyclic portion of one possible example of the network of FIG. 1.

FIG. 3A is a graphical representation of a simple cyclic portion 300 of one possible example of the network 100 of FIG. 1, where the cyclic portion 300 consists of four nodes 0-3 interconnected by four (unidirectional) channels 302, where node 0 is an edge node having a network input channel 304 and node 2 is an edge node having a network output channel 306.

FIG. 3B is a graphical representation of one possible decomposition of the cyclic portion 300 of FIG. 3A into, in this case, a single acyclic portion consisting of nodes 0-3, where node 0 is the first node in the acyclic portion and the channel from node 3 to node 0 is designated as a feedback edge.

FIG. 3C is a graphical representation of another possible decomposition of the cyclic portion 300 of FIG. 3A into, in this case, (i) a first acyclic portion consisting of nodes 0-1, where node 0 is the first node in the first acyclic portion and the channel from node 3 to node 0 is designated as a feedback edge and (ii) a second acyclic portion consisting of nodes 2-3, where node 2 is the first node in the second acyclic portion and the channel from node 1 to node 2 is designated as a feedback edge.

Those skilled in the art will understand that there are many different possible techniques for decomposing cyclic portions of networks, including those described by Guy Even et al., "Approximating Minimum Feedback Sets and Multicuts in Directed Graphs," *Algorithmica* 20, 2, 151-174 (1998) ("the Even paper"), the teachings of which are incorporated herein by reference.

As used herein, the term "decomposed network" refers to the network resulting from decomposing at least one cyclic portion of an original network into one or more acyclic portions and one or more feedback edges, even if the resulting network still has one or more cyclic portions.

After any decomposition, the decomposed network will have one or more acyclic portions and possibly one or more cyclic portions, where each acyclic portion will have one or more first nodes, where each first node has zero, one, or more input channels, each of which is either a network input or a designated feedback edge. Thus, in the decomposition of FIG. 3B, the first node 0 has two input channels: network input 304 and feedback edge 308. Similarly, in the decomposition of FIG. 3C, (i) the first node 0 of the first acyclic portion has two input channels: network input 304 and feedback edge 310 and (ii) the first node 2 of the second acyclic portion has one input channel: feedback edge 312.

Note that, after decomposition, any channels between different cyclic and/or acyclic portions of the network will be designated as feedback edges for the network update procedure. Note further that the incoming and outgoing channels of bidirectional links between nodes are treated independently during the network decomposition and during the subsequent network update procedure.

According to certain embodiments of the disclosure, after decomposing at least the cyclic portion 300 of the network 100 into one or more acyclic portions having one or more feedback edges, the resulting, decomposed network can be updated by applying (i) the first version of the network update procedure to any remaining cyclic portions in the decomposed network and (ii) the second version of the network update procedure to at least some (or all) of the acyclic portions of the decomposed network. Note that it is at least possible to apply the first version of the update procedure to some of the acyclic portions of the decomposed network, although there might be no advantage to doing so, at least in terms of avoiding dropped packets.

As represented in FIGS. 3B and 3C, the first node in a cyclic portion is selected to be an initial node for either version of the update procedure. Thus, in the decomposition of FIG. 3B, node 0 is the initial node for the single acyclic portion and, in the decomposition of FIG. 3C, nodes 0 and 2 are initial nodes for their respective acyclic portions.

Note that, in some implementations, any packets that traverse a feedback edge from an un-updated node (i.e., a node that still uses its old node configuration) to an updated node (i.e., a node that is using its new node configuration) will be dropped by the receiving, updated node. The receiving node will know that a transmitting node has been updated when the receiving node receives a marker from the transmitting node. When the receiving node is the first node of an acyclic portion, the receiving node can stop treating the corresponding incoming channel as a feedback edge. From then on, the receiving node will not have to drop incoming packets from that transmitting node.

Thus, in these implementations, in the decomposition of FIG. 3B, after node 0 has been updated, but before node 3 has been updated, any packets transmitted from node 3 to node 0 will be dropped by node 0. Similarly, in the decomposition of FIG. 3C, (i) after node 0 has been updated, but before node 3 has been updated, any packets transmitted from node 3 to node 0 will be dropped by node 0 and, likewise, after node 2 has been updated, but before node 1 has been updated, any packets transmitted from node 1 to node 2 will be dropped by node 2.

In each case, after receiving a marker from the transmitting node, the receiving node will not have to drop incoming packets from that transmitting node. Thus, in the decomposition of FIG. 3B, after node 0 receives a marker from node 3, node 0 can stop treating the incoming channel from node 3 as a feedback edge. Similarly, in the decomposition of FIG. 3C, (i) after node 0 receives a marker from node 3, node 0 can stop treating the incoming channel from node 3 as a feedback edge and (ii) after node 2 receives a marker from node 1, node 2 can stop treating the incoming channel from node 2 as a feedback edge.

While packets may still be dropped during the update of a decomposed network, if the decomposition of cyclic portions is performed strategically such that the feedback edges correspond to network links having, on average, relatively low levels of packet traffic, the overall number of packets dropped may be lower than the overall number of dropped packets in the original (i.e., non-decomposed) network.

Figure 4:
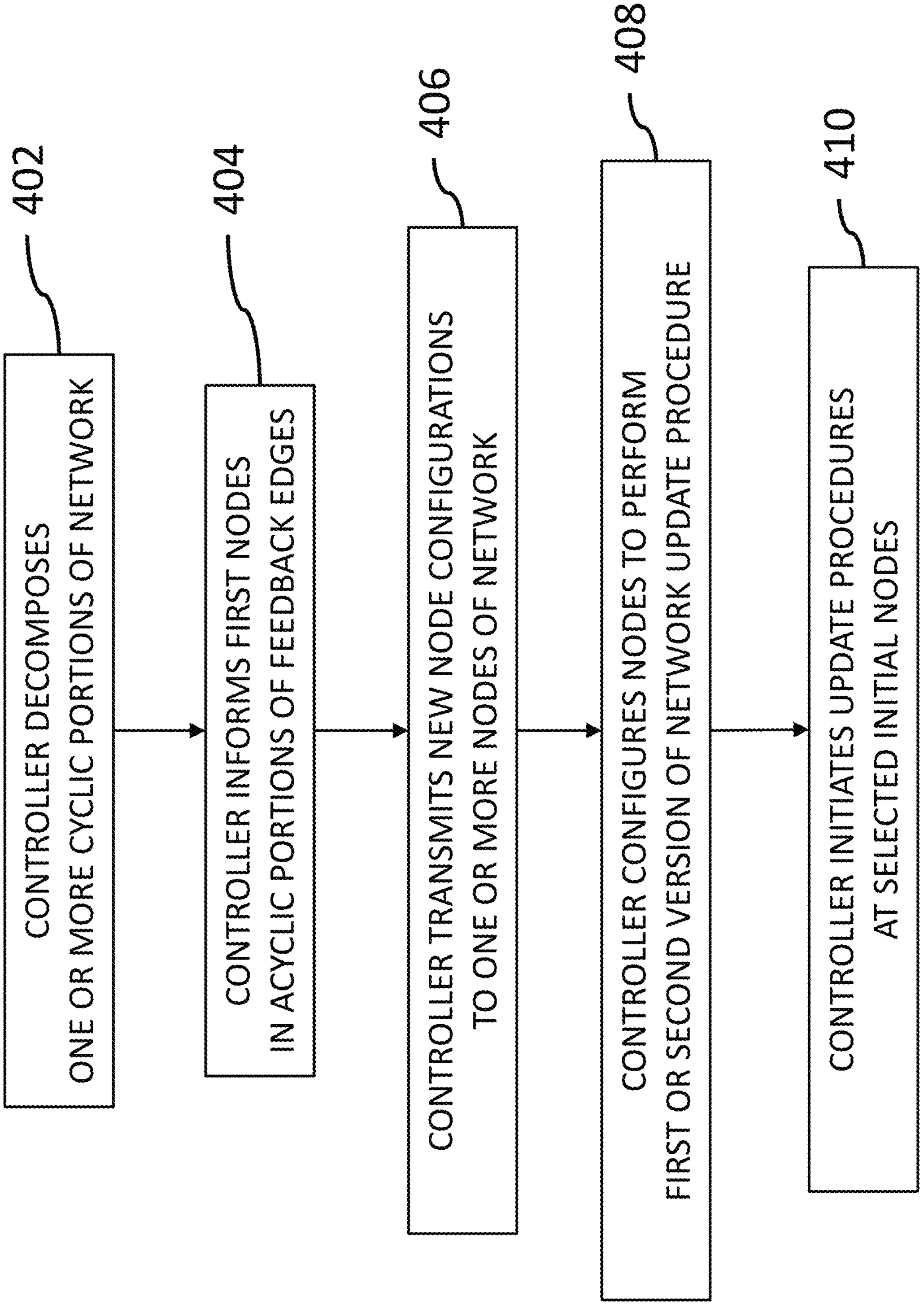
FIG. 4 is a flow diagram of processing performed by the controller of FIG. 1 to update the network according to certain embodiments employing a network decomposition technique.

FIG. 4 is a flow diagram of processing 400 performed by the controller 120 of FIG. 1 to update the network 100 according to certain embodiments employing a network decomposition technique. In step 402, the controller 120 decomposes one or more (and possibly all) of the cyclic portions in the network 100 into corresponding acyclic portions. In step 404, the controller 120 informs the first node in each acyclic portion of the decomposed network that the first node's incoming channels from any other network nodes are to be treated as feedback edges for the network update. In step 406, the controller 120 transmits new node configurations to one or more nodes 112 of the network 100. In step 408, the controller 120 selectively configures each node 112 to perform an appropriate one of the first version of the network update procedure or the second version of the network update procedure, where each node 112 of an acyclic portion is configured to perform the second version. In step 410, the controller 120 initiates the corresponding configured version of the network update procedure at each selected initial node in the network 100, where the first node in each acyclic portion is selected as an initial node for the second version of the network update procedure. From then, each node 112 performs its configured version of the update procedure until the entire network 100 has been updated.

Note that, as suggested previously, the transmission of the new node configurations of step 406 can occur at any appropriate time during the processing 400 of FIG. 4, including (but not limited to) before step 402 or during step 410.

Backwards Compatibility

According to the first version of the network update procedure, after a given node has replaced its old node configuration with its new node configuration, that given node will drop any incoming packet received from another node from which the given node has not yet received an incoming marker. Similarly, according to the network decomposition technique described in the previous section, after a given node operating under the second version of the network update procedure has replaced its old node configuration with its new node configuration, that given node will drop any incoming packet received over a feedback edge from another node from which the given node has not yet received an incoming marker.

As described previously, in some network updates, some of the network nodes will retain their old node configurations, while others will receive new node configurations. As understood by those skilled in the art, a node configuration may be characterized as a set of processing rules that instruct a node how to handle different types of packets, where different subsets of processing rules may apply to different packet types. When the configuration of a node does get updated, the new node configuration will have at least one processing rule that is not in the old configuration, but the new configuration may also have one or more processing rules that are the same as processing rules in the old configuration.

According to a backwards compatibility technique, a packet that would otherwise be dropped because the packet was received from a transmitting node from which the receiving node has not yet received a marker, might not be dropped by the receiving node if the processing rules that apply to that packet were not changed at the receiving node. In other words, if the node configuration at the receiving node was not changed or if the node configuration was updated but the relevant processing rules for that particular packet were not changed, then the receiving node can apply those processing rules and not drop the packet. If, on the other hand, the receiving node would need to apply even one changed processing rule to the received packet, then the receiving node will drop the packet.

In one implementation of such an embodiment, as part of the update of a node's configuration, the controller 120 identifies, e.g., using suitable flags, which processing rules of the new node configuration are different from processing rules in the node's old configuration and which processing rules are the same. In some implementations, those flags can be cleared after a node receives a marker on all of its incoming channels.

A flag is added to a packet by an updated node when the updated node determines that an incoming packet from a non-updated node is to be processed at the updated node in a backwards-compatible manner at that updated node. A flag may be added, e.g., using an appropriate flag in the packet or by appropriately encapsulating the packet.

The causal update process guarantees that all nodes downstream of this updated node will have been updated when the flagged packet reaches them, since the marker precedes the flagged packet. Then, each downstream node processes the flagged packet and decides either to drop the packet (because its action on the packet is not backwards compatible) or to process the packet, retaining the flag on any output packets produced as a result of the processing. A typical processing step has the output packet identical to the input packet, but a more-complex processing step may modify the input packet or create one or more fresh output packets, hence the phrasing "produced as a result."

In this way, all receiving nodes will be able to distinguish between packets that can be processed and packets that need to be dropped. If such a packet reaches its destination network node without being dropped by any node along its path, then the total number of dropped packets in the network may be further reduced.

Figure 5:
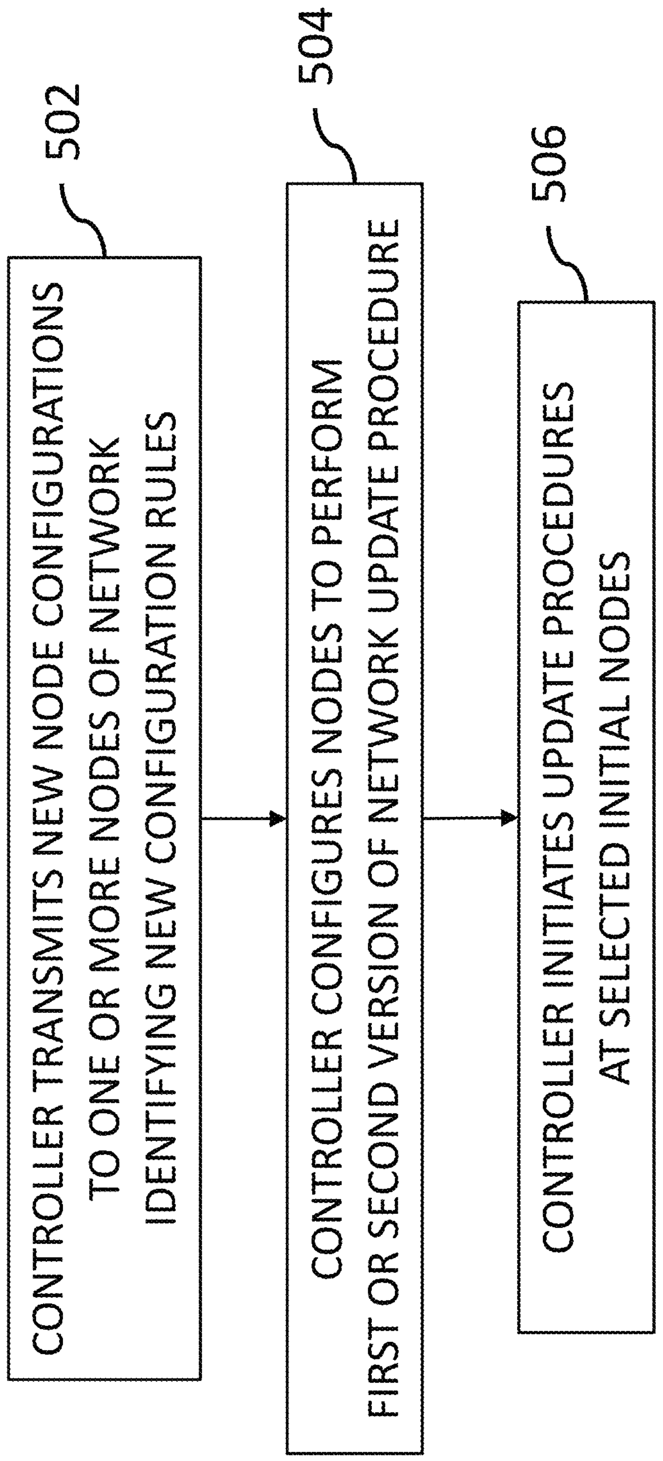
FIG. 5 is a flow diagram of processing performed by the controller of FIG. 1 to update the network according to certain embodiments employing a backward compatibility technique.

FIG. 5 is a flow diagram of processing 500 performed by the controller 120 of FIG. 1 to update the network 100 according to certain embodiments employing a backward compatibility technique. In step 502, the controller 120 transmits new node configurations to one or more nodes 112 of the network 100, where each node configuration identifies which processing rules are different from the processing rules in the node's old node configuration. In step 504, the controller 120 selectively configures each network node 112 to perform an appropriate one of the first version or the second version of the network update procedure. In step 506, the controller 120 initiates the corresponding configured version of the update procedure at each selected initial node 112 in the network 100. From then, each node 112 performs its configured version of the update procedure, including processing backwards-compatible packets, instead of dropping those packets, until the entire network 100 has been updated.

Note that, as suggested previously, the transmission of the new node configurations of step 502 can occur at any appropriate time during the processing 500 of FIG. 5, including during step 506.

Note that this backwards compatibility technique can be, but does not have to be, combined with the previously described network decomposition technique, and vice versa. When a network performs both techniques, a packet arriving at the first node of an acyclic portion over a feedback edge can be processed instead of being dropped if the processing rules for that packet did not change at the first node.

The following sections provide further information about the update procedures of this disclosure.

Reducing Packet Drops in Causally Consistent Network Update

Network configurations are regularly modified in response to changes to network structure or behavior, or to install new route-security rules. Such modifications must be carried out carefully to avoid introducing configuration inconsistencies that break security rules or create routing loops. We present methods that improve the performance of the provably consistent "causal" network update algorithm described in the '918 application. This algorithm updates network elements in place and operates on the fly, but it may drop packets to preserve route-consistency. The new methods reduce packet drops by exploiting network structure and route-compatibility between the current and new configurations.

INTRODUCTION

Network configurations are updated for many reasons: to recover from failures and traffic congestion, to adjust network routes after an expansion, or to install new route security policies. A configuration update typically modifies the routing properties of several network elements such as switches and firewalls. It is well known that updating network elements in the wrong order may introduce routing loops, black holes, or violations of route security. Although the failures are temporary, they may have cascading effects on the performance and security of applications that rely on the network.

The "causal update" algorithm of the '918 application guarantees consistent updates, while operating on the fly and updating individual network elements in place. See, also, Kedar S. Namjoshi, Sougol Gheissi, and Krishan K. Sabnani, "Algorithms for In-Place, Consistent Network Update," *Proceedings of the ACM SIGCOMM* 2024 *Conference,* 244-257, Sydney, Australia, Aug. 4-8, 2024 ("the Namjoshi paper"), the teaching of which are incorporated herein by reference in their entirety. (It is the only known algorithm that has these properties.) However, in some scenarios, the algorithm is required to drop data packets to preserve route-consistency. We present methods that reduce packet drops and thus improve network throughput during the update process.

The causal update algorithm guarantees a critical update-consistency property called "per-packet consistency" that was formulated in Mark Reitblatt, Nate Foster, Jennifer Rexford, Cole Schlesinger, and David Walker, *Abstractions for Network Update* (*SIGCOMM* '12), Association for Computing Machinery, 2021, the teaching of which are incorporated herein by reference in their entirety. This property requires that the route taken by a packet through a network under update either passes entirely through the old configuration or entirely through the new configuration. As the configurations are assumed to be valid on their own, per-packet consistency ensures that there are no routing failures such as routing loops or security violations during the update.

Background: The Causal Update Algorithm

We give a condensed and simplified view of the algorithm here. The algorithm propagates a special "marker" control packet, which controls the order in which nodes are updated, and also controls when and how data packets are processed.

A network update is started by a network controller, which sends markers to an initial set of nodes. The choice of initial nodes is constrained only by the requirement that every other node is reachable from the set of initial nodes.

On the first reception of a marker, a node updates its configuration (which we refer to as "turning green" as the colors red and green are used to refer to the current and new configurations, respectively), then sends markers on all its output channels. Once a node is updated, it drops any packet that is received from an input channel on which it has not yet received a marker.

Intuitively, the markers form a "wavefront" that passes through the network. Nodes behind the front have updated configurations, while nodes ahead of the front have the old configuration. Thus, during the update the network is in a mixed-configuration mode. The update terminates when all nodes have updated. Termination time is proportional to the network diameter.

The causal update algorithm is the first algorithm that satisfies three desirable properties: it works on the fly (i.e., the network is updated while it continues to operate), nodes are updated in place (i.e., old and new configurations do not coexist at any node), and the update process is per-packet consistent. However, the algorithm may drop packets. That is provably unavoidable for any algorithm with these properties. See Namjoshi et al.

Reducing Packet Drops

There are situations where packet drops can be reduced or eliminated. (1) If the network is acyclic, then the general causal update algorithm can be adjusted to eliminate packet drops altogether. This is done by allowing a node to be updated only after markers have been received on all input channels. (Following this rule for cyclic networks may lead to deadlock.) (2) If a (possibly cyclic) network can be decomposed into strongly connected components where some terminal components have a trivial update, then packets need not be dropped in those terminal components.

In the following, we present two methods that substantially generalize these situations. The first method partitions the network into acyclic components, restricting packet drops only to the channels that transition between these components. The second method allows a packet route to pass through a mixture of old and new configurations so long as the processing at the new configuration nodes on that route is backward compatible for that packet.

The connectivity structure of a network is viewed as a directed graph G=(N, E) where N is the set of network nodes and E is the set of (directed) network edges. A network configuration associates a state machine with every node. A configuration update thus consists of replacing the current state machine at a node with a new version. Every edge is associated with a channel over which packets are sent. Thus, every node has a set of input channels, which correspond to edges directed towards that node, and a set of output channels, which correspond to edges originating at that node. A node m is a predecessor of a node n if (m, n) is in E. Node m is a successor of node n if (n, m) is in E.

Acyclic Partitioning

This method works as follows.

(1) The network graph G is partitioned into acyclic components $A_1, \ldots, A_m$ by choosing a subset of edges F whose removal makes the remaining graph cycle-free. The set F is known as a feedback edge set. Such a decomposition is possible for every graph. The correctness of the modified causal update mechanism is independent of the choice of F. However, the choice of F may influence the number of packet drops and thus the throughput loss during the update. We discuss this later.

(2) For a node n in a component A, the modified update mechanism operates as follows. (We only highlight the key difference from the original algorithm of the '918 application.) In the modified method, node n may be updated only after a marker has been received from every input channel from every predecessor of n that is also in the same component A.

(3) The causal update process is started by turning green all initial nodes of every acyclic component. For example, the update controller sends each such node a marker, which forces it to update its configuration. A node n of a component A is an initial node of A if all of its incoming edges are input edges of the network or belong to the feedback edge set.

The modified rule has two consequences: (1) If every predecessor of n is in A, then no packets are dropped at n, since the update at n occurs after a marker has been received from every input channel. (Note that if G is itself acylic, we can choose the decomposition as A=G. This is the special case discussed in the Namjoshi paper.) (2) Otherwise, packets may be dropped at n but every dropped packet must be received on a channel that represents a feedback edge.

Theorem 2.1: The acyclic-partitioned causal update procedure is consistent, operates on the fly, and in place.

Choosing a Feedback Edge Set

Now to the choice of F. As packet drops occur only on channels representing edges in F, we may choose F so as to minimize the expected number of drops. For instance, say that the average packet flow rate is known for every channel. Then we choose F such that (1) F is a feedback edge set for G, and (2) the sum of the average flow rate over F is minimized.

This gives a (very loose) upper bound for the packet loss. Letting flow(F) represent the sum of the average flow rate over F and letting T represent the time to update the network, the packet loss is upper-bounded by flow (F)*T (in expectation), as that bounds the expected number of packets that flow over channels in F during the update.

However, note that choosing F so that the average flow rate is minimized is an NP-hard problem. This follows from the fact that finding the minimum-size feedback edge set is an NP-complete problem. (The reduction assigns a flow rate of 1 to each edge.) There are polynomial-time algorithms that compute an approximation to the minimal feedback set. See the Even paper.

Routing Compatibility

To simplify the explanation of compatibility, we follow the convention of the Namjoshi paper and (conceptually) assign colors to nodes, channels, and packets. Nodes that have the old configuration are colored Red, as are all packets that are processed by Red nodes. Nodes with the new configuration are colored Green, as are all packets that are processed by Green nodes. Every input channel at a node is initially Red; it "turns Green" from the viewpoint of its target node after the node receives a marker on that channel.

From this point of view, the per-packet consistency criterion is that the route taken by a packet through a network under update may be viewed as passing only through nodes of the same color: either all Red (i.e., old configuration) or all Green (i.e., new configuration).

The causal update algorithm ensures that a packet processed by a Green node m is never processed by a successor Red node n, since that packet must be preceded by a marker on the channel from m to n; hence, node n must turn Green before it processes this packet.

Furthermore, the algorithm ensures that a packet processed by a Red node m is never processed by a successor Green node n, as that packet is dropped. But this action is potentially too strict. If the old and new configurations at node n agree on the action to be taken on this packet, then one may consider the packet to have been processed by the old (i.e., Red) configuration at n. But this packet should not be considered as a Green packet, as that may lead to a consistency failure at a later point, where the old and new configurations do not agree on the action to be taken on that packet. The method avoids this possibility by explictly tagging the packet as Red. (In practice, tagging can be done in several ways, either by using unused bits in the packet header or through encapsulation.)

The method works as follows.

(1) At each node n, compute the set of packets that is handled identically by the Red and Green configurations at that node. This can be formulated as the set BC(n)={p|RED(n)(p)=GREEN(n)(p)}. Here, RED(n) (resp. GREEN(n)) is the packet processing function at node n according to the Red (resp. Green) configuration. The notation BC(n) specifies the "backward compatible" behavior of the Green function at node n.

For a pure routing function, this set can be computed using BDD (Binary Decision Diagram) or other symbolic representations of the Red and Green routing functions. (BDD representations of routing functions are used in network analysis.)

If the functionality at node n is stateful, it is more difficult to compute the backward-compatible behavior, as that is state-dependent. We propose a method below, but that requires maintaining the old state machine as a shadow for the new state machine, which may not always be feasible given resource constraints.

(2) The update algorithm follows the causal update pattern (or its variations) in propagating markers and in deciding when a node changes from its Red configuration to the Green one. The difference is in the handling of packets by a Green node n.

Consider a packet p that is either tagged Red and arrives on a Green channel, or is untagged but arrives on a Red channel. If this packet is in the backward compatibility set BC(n), the packet is processed by node n and any packets created as a result are tagged as Red. Otherwise, the packet p is dropped.

Packet tags are erased when a packet exits the network.

(3) Note that it suffices to use an under-approximation of BC(n). (In the extreme case, one uses the empty set as the under-approximation, which results in all Red packets being dropped at Green nodes, which is the behavior of the original algorithm.)

Theorem 2.2: The compatibility-based variant of the causal update algorithm satisfies per-packet consistency.

Proof: Consider the route taken by a packet p through the network. The proof is by cases and by contradiction.

Suppose that this route starts at a Red node but cannot be viewed as consistent. Then there is a first point on the route where this packet is processed by a Green node whose behavior differs from its Red version. But that is not allowed by the processing rule.

Suppose that this route starts at a Green node. Hence, packet p is preceded by a marker throughout its route. By the causal update algorithm, every node on that route processes packet p only after it turns Green; hence, there cannot be an inconsistency.

Stateful Updates

At a stateful node, the state space of the Red and Green versions may be different. Thus, to check for compatibility, one must retain the Red version as a shadow state machine after updating to the Green machine. Every incoming packet is processed by both machines. If the packet is a Green packet, then the action taken is that of the Green machine. Consider a Red packet (either untagged and arriving on a Red channel, or tagged and arriving on a Green channel). If the actions of the Red and Green machines on this packet differ, then the packet is dropped. Otherwise, all outgoing packets created as a result are tagged Red. The state of both machines is updated in either case so that the machine states stay synchronized.

For a stateless node n, the set BC(n) is computed in advance of the update. (As discussed, an under-approximation to BC(n) may be easier to compute and also suffices.) However, a stateful node n must keep both Red and Green state machines active. This adds memory and computational overhead so it may be used only in some cases. If this mechanism is not used, then the stateful node follows the original causal update rule of dropping all Red packets.

In certain embodiments, the present disclosure is a controller for a network comprising a plurality of interconnected nodes and having a cyclic portion, each node comprising one or more links connecting the node to one or more other nodes of the network, wherein each link corresponds to an incoming channel and/or an outgoing channel, where at least one node is configured to perform an update procedure in which the node (i) keeps track of incoming markers received on the node's one or more incoming channels, if any exist, (ii) transmits an outgoing marker on all outgoing channels, if any exist, based upon receipt of the one or more incoming makers, and (iii) updates its configuration from an old node configuration to a new node configuration, if any, based upon the receipt of the one or more incoming markers. The controller comprises at least one processor and at least one memory storing instructions that, upon being executed by the at least one processor, cause the controller at least to (i) decompose the cyclic portion of the network into at least a first acyclic portion and at least a first feedback edge, wherein the first acyclic portion has at least one first node connected to the first feedback edge; (ii) inform the at least one first node of the first feedback edge; (iii) provide a new node configuration to at least one of the nodes; and (iv) instruct a subset of the nodes to initiate the update procedure. The subset comprises the at least one first node of the first acyclic portion of the network and, during the update procedure, the at least one first node is configured to determine whether to process or drop a data packet received over the first feedback edge.

In at least some of the above embodiments, the controller is configured to decompose the network into a fully decomposed network having no cyclic portions.

In at least some of the above embodiments, after initiating the update procedure and before the at least one first node receives an incoming marker over the first feedback edge, the at least one first node is configured to drop the data packet received over the first feedback edge.

In at least some of the above embodiments, after initiating the update procedure and before the at least one first node receives an incoming marker over the first feedback edge (i) upon determining that the at least one first node has no processing rules for the data packet that changed from the at least one first node's old node configuration, the at least one first node is configured to process the data packet received over the first feedback edge and (ii) upon determining that the at least one first node has at least one processing rule for the data packet that changed from the at least one first node's old node configuration, the at least one first node is configured to drop the data packet received over the first feedback edge.

In at least some of the above embodiments, the controller is configured to provide the subset of the nodes to ensure that every node having at least one incoming channel will eventually receive an incoming marker on each incoming channel during the update procedure.

In at least some of the above embodiments, the controller is configured to configure at least one node to perform a first update procedure in which, after receiving an initial incoming marker, the node (i) updates its configuration from the old node configuration to the new node configuration and (ii) transmits an outgoing marker on all outgoing channels, if any exist, before processing or transmitting any more data packets.

In at least some of the above embodiments, according to the first update procedure, prior to the node updating its configuration, (i) upon receiving an incoming data packet on an incoming channel on which the node has not yet received an incoming marker, the node processes the incoming data packet based on the node's old node configuration and (ii) upon receiving an incoming data packet on an incoming channel on which the node has already received an incoming marker, the node queues the incoming data packet for later processing after the node has updated its configuration. After the node updating its configuration, (i) upon receiving an incoming data packet on an incoming channel on which the node has already received an incoming marker, the node processes the incoming data packet based on the node's new node configuration and (ii) upon receiving an incoming data packet on an incoming channel on which the node has not yet received an incoming marker, the node drops the incoming data packet.

In at least some of the above embodiments, (i) the controller is configured to configure at least one node to perform a second update procedure in which, after receiving a final incoming marker, the node updates its configuration from the old node configuration to the new node configuration and (ii) according to the second update procedure, after updating its configuration, the node transmits an outgoing marker on all outgoing channels, if any exist, before processing or transmitting any more data packets.

In at least some of the above embodiments, according to the second update procedure, prior to the node updating its configuration, (i) upon receiving an incoming data packet on an incoming channel on which the node has not yet received an incoming marker, the node processes the incoming data packet based on the node's old node configuration and (ii) upon receiving an incoming data packet on an incoming channel on which the node has already received an incoming marker, the node queues the incoming data packet for later processing after the node has updated its configuration. After the node updating its configuration, upon receiving an incoming data packet on an incoming channel, the node processes the incoming data packet based on the node's new node configuration.

In at least some of the above embodiments, the controller is configured to configure the network such that (i) at least one node is configured to perform a first update procedure and (ii) at least one other node is concurrently configured to perform a second update procedure different from the first update procedure.

In certain other embodiments, the present disclosure is a first node in an acyclic portion of a network comprising a plurality of interconnected nodes. The first node comprises (i) one or more links connecting the first node to one or more other nodes of the network, wherein each link corresponds to an incoming channel and/or an outgoing channel, (ii) at least one processor, and (iii) at least one memory storing instructions that, upon being executed by the at least one processor, cause the first node at least to (a) receive information about at least a first feedback edge connected to the first node; (b) keep track of incoming markers received on the first node's one or more incoming channels; (c) transmit an outgoing marker on each outgoing channel, if any exist, based upon receipt of the one or more incoming markers; and (d) during the update procedure, determine whether to process or drop a data packet received over the first feedback edge.

In at least some of the above embodiments, after initiating the update procedure and before the first node receives an incoming marker over the first feedback edge, the first node is configured to drop the data packet received over the first feedback edge.

In at least some of the above embodiments, after initiating the update procedure and before the first node receives an incoming marker over the first feedback edge, (i) upon determining that the first node has no processing rules for the data packet that changed from the first node's old node configuration, the first node is configured to process the data packet received over the first feedback edge and (ii) upon determining that the first node has at least one processing rule for the data packet that changed from the first node's old node configuration, the first node is configured to drop the data packet received over the first feedback edge.

In at least some of the above embodiments, (i) the first node is configured to perform the update procedure in which, after receiving a final incoming marker, the first node updates its configuration from an old node configuration to a new node configuration and (ii) according to the update procedure, after updating its configuration, the first node is configured to transmit an outgoing marker on all outgoing channels, if any exist, before processing or transmitting any more data packets.

In at least some of the above embodiments, according to the update procedure, prior to the first node updating its configuration, (i) upon receiving an incoming data packet on an incoming channel on which the first node has not yet received an incoming marker, the first node processes the incoming data packet based on the first node's old node configuration and (ii) upon receiving an incoming data packet on an incoming channel on which the first node has already received an incoming marker, the first node queues the incoming data packet for later processing after the first node has updated its configuration. After the first node updating its configuration, upon receiving an incoming data packet on an incoming channel, the first node processes the incoming data packet based on the first node's new node configuration.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits.

The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A controller for a network comprising a plurality of interconnected nodes and having a cyclic portion, each node comprising one or more links connecting the node to one or more other nodes of the network, wherein each link corresponds to an incoming channel and/or an outgoing channel, where at least one node is configured to perform an update procedure in which the node (i) keeps track of incoming markers received on the node's one or more incoming channels, if any exist, (ii) transmits an outgoing marker on all outgoing channels, if any exist, based upon receipt of the one or more incoming makers, and (iii) updates its configuration from an old node configuration to a new node configuration, if any, based upon the receipt of the one or more incoming markers, the controller comprising:

at least one processor; and at least one memory storing instructions that, upon being executed by the at least one processor, cause the controller at least to:

decompose the cyclic portion of the network into at least a first acyclic portion and at least a first feedback edge, wherein the first acyclic portion has at least one first node connected to the first feedback edge;

inform the at least one first node of the first feedback edge;

provide a new node configuration to at least one of the nodes; and instruct a subset of the nodes to initiate the update procedure, wherein:

the subset comprises the at least one first node of the first acyclic portion of the network; and during the update procedure, the at least one first node is configured to determine whether to process or drop a data packet received over the first feedback edge.

2. The controller of claim 1, wherein the controller is configured to decompose the network into a fully decomposed network having no cyclic portions.

3. The controller of claim 1, wherein, after initiating the update procedure and before the at least one first node receives an incoming marker over the first feedback edge, the at least one first node is configured to drop the data packet received over the first feedback edge.

4. The controller of claim 1, wherein, after initiating the update procedure and before the at least one first node receives an incoming marker over the first feedback edge:

upon determining that the at least one first node has no processing rules for the data packet that changed from the at least one first node's old node configuration, the at least one first node is configured to process the data packet received over the first feedback edge; and upon determining that the at least one first node has at least one processing rule for the data packet that changed from the at least one first node's old node configuration, the at least one first node is configured to drop the data packet received over the first feedback edge.

5. The controller of claim 1, wherein the controller is configured to provide the subset of the nodes to ensure that every node having at least one incoming channel will eventually receive an incoming marker on each incoming channel during the update procedure.

6. The controller of claim 1, wherein, the controller is configured to configure at least one node to perform a first update procedure in which, after receiving an initial incoming marker, the node (i) updates its configuration from the old node configuration to the new node configuration and (ii) transmits an outgoing marker on all outgoing channels, if any exist, before processing or transmitting any more data packets.

7. The controller of claim 6, wherein, according to the first update procedure:

prior to the node updating its configuration:

upon receiving an incoming data packet on an incoming channel on which the node has not yet received an incoming marker, the node processes the incoming data packet based on the node's old node configuration; and upon receiving an incoming data packet on an incoming channel on which the node has already received an incoming marker, the node queues the incoming data packet for later processing after the node has updated its configuration; and after the node updating its configuration:

upon receiving an incoming data packet on an incoming channel on which the node has already received an incoming marker, the node processes the incoming data packet based on the node's new node configuration; and upon receiving an incoming data packet on an incoming channel on which the node has not yet received an incoming marker, the node drops the incoming data packet.

8. The controller of claim 1, wherein:

the controller is configured to configure at least one node to perform a second update procedure in which, after receiving a final incoming marker, the node updates its configuration from the old node configuration to the new node configuration; and according to the second update procedure, after updating its configuration, the node transmits an outgoing marker on all outgoing channels, if any exist, before processing or transmitting any more data packets.

9. The controller of claim 8, wherein, according to the second update procedure:

prior to the node updating its configuration:

upon receiving an incoming data packet on an incoming channel on which the node has not yet received an incoming marker, the node processes the incoming data packet based on the node's old node configuration; and upon receiving an incoming data packet on an incoming channel on which the node has already received an incoming marker, the node queues the incoming data packet for later processing after the node has updated its configuration; and after the node updating its configuration, upon receiving an incoming data packet on an incoming channel, the node processes the incoming data packet based on the node's new node configuration.

10. The controller of claim 1, wherein the controller is configured to configure the network such that (i) at least one node is configured to perform a first update procedure and (ii) at least one other node is concurrently configured to perform a second update procedure different from the first update procedure.

11. A method for a controller for a network comprising a plurality of interconnected nodes and having a cyclic portion, each node comprising one or more links connecting the node to one or more other nodes of the network, wherein each link corresponds to an incoming channel and/or an outgoing channel, where at least one node is configured to perform an update procedure in which the node (i) keeps track of incoming markers received on the node's one or more incoming channels, if any exists, (ii) transmits an outgoing marker on all outgoing channels, if any exist, based upon receipt of the one or more incoming makers, and (iii) updates its configuration from an old node configuration to a new node configuration, if any, based upon the receipt of the one or more incoming markers, the method comprising the controller:

decomposing the cyclic portion of the network into at least a first acyclic portion and at least a first feedback edge, wherein the first acyclic portion has a at least one first node connected to the first feedback edge;

informing the at least one first node of the first feedback edge;

providing a new node configuration to at least one of the nodes; and instructing a subset of the nodes to initiate the update procedure, wherein:

the subset comprises the at least one first node of the first acyclic portion of the network; and during the update procedure, the at least one first node determines whether to process or drop a data packet received over the first feedback edge.

12. A first node in an acyclic portion of a network comprising a plurality of interconnected nodes, the first node comprising:

one or more links connecting the first node to one or more other nodes of the network, wherein each link corresponds to an incoming channel and/or an outgoing channel;

at least one processor; and at least one memory storing instructions that, upon being executed by the at least one processor, cause the first node at least to:

receive information about at least a first feedback edge connected to the first node;

keep track of incoming markers received on the first node's one or more incoming channels;

transmit an outgoing marker on each outgoing channel, if any exist, based upon receipt of the one or more incoming markers; and during the update procedure, determine whether to process or drop a data packet received over the first feedback edge.

13. The first node of claim 12, wherein, after initiating the update procedure and before the first node receives an incoming marker over the first feedback edge, the first node is configured to drop the data packet received over the first feedback edge.

14. The first node of claim 12, wherein, after initiating the update procedure and before the first node receives an incoming marker over the first feedback edge:

upon determining that the first node has no processing rules for the data packet that changed from the first node's old node configuration, the first node is configured to process the data packet received over the first feedback edge; and upon determining that the first node has at least one processing rule for the data packet that changed from the first node's old node configuration, the first node is configured to drop the data packet received over the first feedback edge.

15. The first node of claim 12, wherein:

the first node is configured to perform the update procedure in which, after receiving a final incoming marker, the first node updates its configuration from an old node configuration to a new node configuration; and according to the update procedure, after updating its configuration, the first node is configured to transmit an outgoing marker on all outgoing channels, if any exist, before processing or transmitting any more data packets.

16. The first node of claim 15, wherein, according to the update procedure:

prior to the first node updating its configuration:

upon receiving an incoming data packet on an incoming channel on which the first node has not yet received an incoming marker, the first node processes the incoming data packet based on the first node's old node configuration; and upon receiving an incoming data packet on an incoming channel on which the first node has already received an incoming marker, the first node queues the incoming data packet for later processing after the first node has updated its configuration; and after the first node updating its configuration, upon receiving an incoming data packet on an incoming channel, the first node processes the incoming data packet based on the first node's new node configuration.

17. A method for a first node in an acyclic portion of a network comprising a plurality of interconnected nodes, the method comprising the first node:

receiving information about at least a first feedback edge connected to the first node;

keeping track of incoming markers received on the first node's one or more incoming channels;

transmitting an outgoing marker on each outgoing channel, if any exist, based upon receipt of the one or more incoming markers; and during the update procedure, determining whether to process or drop a data packet received over the first feedback edge.

* * * * *